(12) United States Patent
Tsukada et al.

(10) Patent No.: US 7,413,067 B2
(45) Date of Patent: Aug. 19, 2008

(54) DOG CLUTCH

(75) Inventors: Yoshiaki Tsukada, Saitama (JP); Kazuhiko Nakamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 251 days.

(21) Appl. No.: 11/336,871

(22) Filed: Jan. 23, 2006

(65) Prior Publication Data
US 2006/0163021 A1 Jul. 27, 2006

(30) Foreign Application Priority Data
Jan. 25, 2005 (JP) ............... 2005-017086

(51) Int. Cl.
*F16D 11/04* (2006.01)
(52) U.S. Cl. ............... 192/69.83; 192/53.34; 192/55.61; 192/108; 192/212
(58) Field of Classification Search ............ 192/53.34, 192/55.61, 69.83
See application file for complete search history.

(56) References Cited

U.S. PATENT DOCUMENTS

| | | | | |
|---|---|---|---|---|
| 2,041,445 A | * | 5/1936 | Warren | 192/48.6 |
| 2,667,252 A | * | 1/1954 | Meyer | 192/69.83 |
| 4,754,659 A | * | 7/1988 | Rietsch | 74/411 |
| 4,811,825 A | * | 3/1989 | Christian et al. | 192/53.32 |
| 6,591,705 B1 | * | 7/2003 | Reik et al. | 74/343 |
| 2004/0040814 A1 | * | 3/2004 | Youk | 192/53.34 |

FOREIGN PATENT DOCUMENTS

JP 2000-35129 A 2/2000

\* cited by examiner

*Primary Examiner*—David D. Le
(74) *Attorney, Agent, or Firm*—Birch, Stewart, Kolasch & Birch, LLP

(57) ABSTRACT

A first dog clutch member is coupled with a rotation transmitting member rotatably mounted on a power transmission shaft with a relative rotation clearance θ. A second dog clutch member is slidably mounted on the power transmission shaft to be engageable/disengageable with/from the first dog clutch member. A damper spring is interposed between the rotation transmitting member and the first dog clutch member. First dog teeth and second dog teeth, which are engaged/disengaged with/from each other by an axial displacement of the second dog clutch member, are formed in the first dog clutch member and the second dog clutch member, respectively. A chamfer is made in each end portion of the respective first dog teeth and each end portion of the respective second dog teeth, which are opposed to each other, so as to guide the second dog teeth to a position to engage with the first dog teeth.

20 Claims, 6 Drawing Sheets ically, to an improvement in a dog clutch which includes a first
DOG CLUTCH

CROSS-REFERENCE TO RELATED APPLICATIONS

The present application claims priority under 35 USC 119 to Japanese Patent Application No. 2005-017086 filed on Jan. 25, 2005 the entire contents of which are hereby incorporated by reference.

1. Field of the Invention

The present invention relates to a dog clutch mainly used as a shifting means for a multistage transmission. More specifically, to an improvement in a dog clutch which includes a first dog clutch member coupled with a rotation transmitting member rotatably mounted on a power transmission shaft with a relative rotation clearance. A second dog clutch member is slidably mounted on the power transmission shaft to be engageable/disengageable with/from the first dog clutch member. A damper spring is interposed between the rotation transmitting member and the first dog clutch member to be elastically deformable within a range of the relative rotation clearance by a torque generated by the rotation transmitting member and the first dog clutch member. The damper spring reduces a torque shock exerted upon engagement of the first and second dog clutch members.

2. Description of Background Art

JP-A No. 35129/2000 discloses a known dog clutch.

The conventional dog clutch is configured such that end portions of respective dogs of the first and second dog clutch members are flat. Thus, when the second dog clutch member is shifted toward the first dog clutch member to engage the clutch, the end portions of the dogs often collide with each other, necessitating a repetition of the shifting operations.

SUMMARY AND OBJECTS OF THE INVENTION

An embodiment of the present invention has been developed in view of the above-described situations. It is an object of an embodiment of the present invention to provide the dog clutch which is always engaged smoothly and without a shock by a single operation for engaging the clutch.

To attain the above object, an embodiment of the present invention provides a dog clutch including a first dog clutch member coupled with a rotational transmitting member rotatably mounted on a power transmission shaft with a relative rotation clearance. A second dog clutch member is slidably mounted on the power transmission shaft to be engageable/disengageable with/from the first dog clutch member. A damper spring is interposed between the rotation transmitting member and the first dog clutch member to be elastically deformable within a range of the relative rotation clearance by a torque generated by the rotation transmitting member and the first dog clutch member.

The dog clutch includes a gear teeth-like first dog teeth and second dog teeth, which are engaged/disengaged with/from each other by an axial displacement of the second dog clutch member that are formed in the first dog clutch member and the second dog clutch member, respectively. A chamfer is made in each of end portions of the first dog teeth and each of end portions of the second dog teeth, which are opposed to each other, so as to guide the second dog teeth to a position to engage with the first dog teeth.

The power transmission shaft corresponds to an output shaft 3 in an embodiment of the invention as described later, the rotation transmitting member corresponds to a first driven gear and a second driven gear in the embodiment, and the second dog clutch member corresponds to a fifth driven gear 15b and a sixth driven gear 16b in the embodiment.

According to the above-described characteristics, when the second dog clutch member is shifted toward the first dog clutch member so as to engage the dog clutch while the rotation transmitting member is rotating relatively to the output shaft, initially the chamfers of the first dog teeth and the chamfers of the second dog teeth are necessarily brought into contact with each other, and then the chamfers of the first dog teeth and the chamfers of the second dog teeth are slid on each other so that the second dog teeth are shifted to the position to fully engage with the first dog teeth. In addition, since the elastic deformation of the damper spring keeps proceeding throughout a period from a moment when the chamfers are brought into contact with each other and start sliding on each other, to a moment when the relative rotation between the rotation transmitting member and the first dog clutch member reaches the maximum in the range of the clearance, the torque shock upon engagement of the first and second dog clutch members can be lowered. Thus, the clutch can be always engaged by a single shifting operation and with a small torque shock.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

There will be described the best mode for carrying out the invention based on preferred embodiments of the invention presented in the accompanying drawings.

Figure 1:
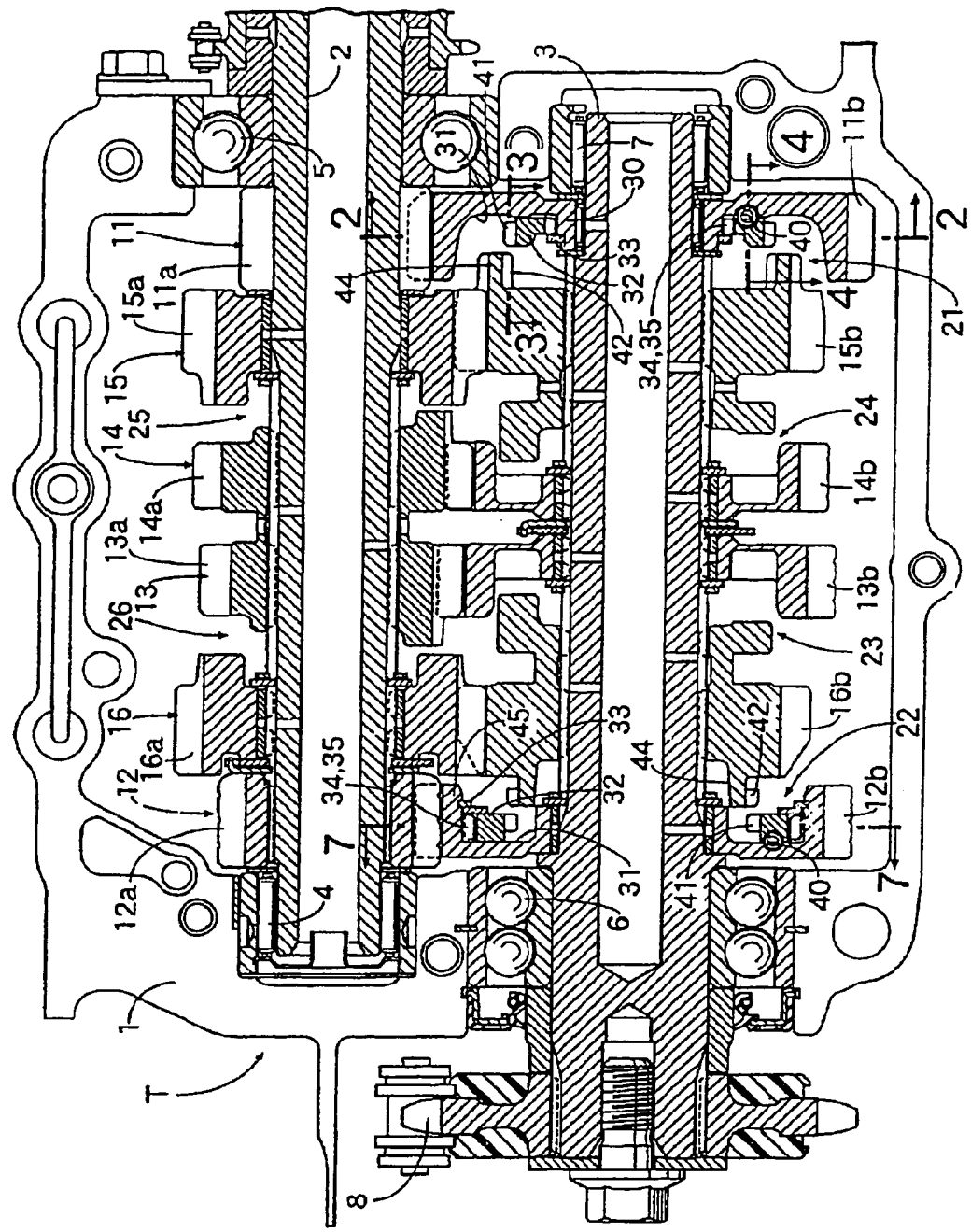
FIG. 1 is a longitudinal cross-sectional view of a multistage transmission for a motorcycle that includes a dog clutch according to a first embodiment and another dog clutch according to a second embodiment of the present invention.

Referring first to FIG. 1, a transmission T for a motorcycle includes a mission case 1 formed integrally with a crankcase of an engine not shown, and an input shaft 2 and an output shaft 3 which are supported in parallel to each other by the mission case 1. The input shaft 2 is supported by a left side wall and a right side wall of the mission case 1 via a needle bearing 4 and a ball bearing 5, respectively, such that the input shaft 2 is rotatable. The engine's power is transmitted, via a starting clutch (not shown), to an exterior end portion of the input shaft 2 which projects out of the right side wall of the mission case 1.

The output shaft 3 is supported by the left side wall and the right side wall of the mission case 1 via a ball bearing 6 and a needle bearing 7, respectively, such that the output shaft 3 is rotatable. A drive sprocket 8 of a chain transmission device for transmitting the power to a rear wheel not shown is attached to an exterior end portion of the output shaft 3 which projects out of the left side wall of the mission case 1.

In the mission case 1 and between the input shaft 2 and the output shaft 3 from the right, a first speed gear train 11, a fifth speed gear train 15, a fourth speed gear grain 14, a third speed gear train 13, a sixth speed gear train 16, and a second speed gear train 12 are sequentially arranged.

The first speed gear train 11 comprises a first speed drive gear 11a formed integrally with the input shaft 2, and a first speed driven gear 11b supported by the output shaft 3 to be rotatable but incapable of axial displacement relatively to the output shaft 3, and being in meshing engagement with the first speed drive gear 11a. The fifth speed gear train 15 comprises a third speed drive gear 13a supported by the input shaft 2 to be rotatable but incapable of axial displacement relatively to the input shaft 2, and a fifth speed driven gear 15b slidably splined to the output shaft 3 and in meshing engagement with the fifth speed drive gear 15a. The fourth speed gear train 14 comprises a fourth speed drive gear 14a slidably splined to the input shaft 2, and a fourth speed driven gear 14b supported by the output shaft 3 to be rotatable but incapable of axial displacement relatively to the output shaft 3, and being in meshing engagement with the fourth speed drive gear 14a. A third speed gear train 13 comprises a third speed drive gear 13a integrally connected to the fourth speed drive gear 14a and slidably splined to the input shaft 2, and a third speed driven gear 13b supported by the output shaft 3 to be rotatable but incapable of axial displacement relatively to the output shaft 3, and in meshing engagement with the third speed drive gear 13a. A sixth speed gear train 16 comprises a sixth speed drive gear 16a supported by the input shaft 2 to be rotatable but incapable of axial displacement relatively to the input shaft 2, and a third driven gear 13b slidably splined to the output shaft 3 and in meshing engagement with the sixth speed drive gear 16a. A second speed gear train 12 comprises a second speed drive gear 12a splined to the input shaft 2 to be incapable of axial displacement, and a second speed driven gear 12b supported by the output shaft 3 to be rotatable but incapable of axial displacement relatively to the output shaft 3, and in meshing engagement with the second speed drive gear 12a.

Between the first speed driven gear 11b and the fifth speed driven gear 15b, there is disposed a dog clutch 21 for a first speed, which is for engaging the first speed gear train 11. Between the fifth speed drive gear 15a and the fourth speed drive gear 14a, there is disposed a dog clutch 25 for a fifth speed, which is for engaging the fifth speed gear train 15. Between the fourth driven gear 14b and the fifth driven gear 15b, there is disposed a dog clutch 24 for a fourth speed, which is for engaging the fourth speed gear train 14. Between the third speed driven gear 13b and the sixth speed driven gear 16b, there is disposed a dog clutch 23 for a third speed, which is for engaging the third speed gear train 13. Between the sixth speed drive gear 16a and the third speed drive gear 13a, there is disposed a dog clutch 26 for a sixth speed, which is for engaging the sixth speed gear train 16. Between the second speed driven gear 12b and the sixth speed driven gear 16b, there is disposed a dog clutch 22 for a second speed, which is for engaging the second speed gear train 12. The first and second embodiments of the invention are applied to the first speed dog clutch 21 and the second speed dog clutch 22, respectively, among these dog clutches. The third through sixth dog clutches have the conventional, typical structure without a damper spring, and description thereof is omitted.

Referring now to FIGS. 1 to 6(c), the first speed dog clutch 21 according to the first embodiment of the invention will be described.

Figure 2:
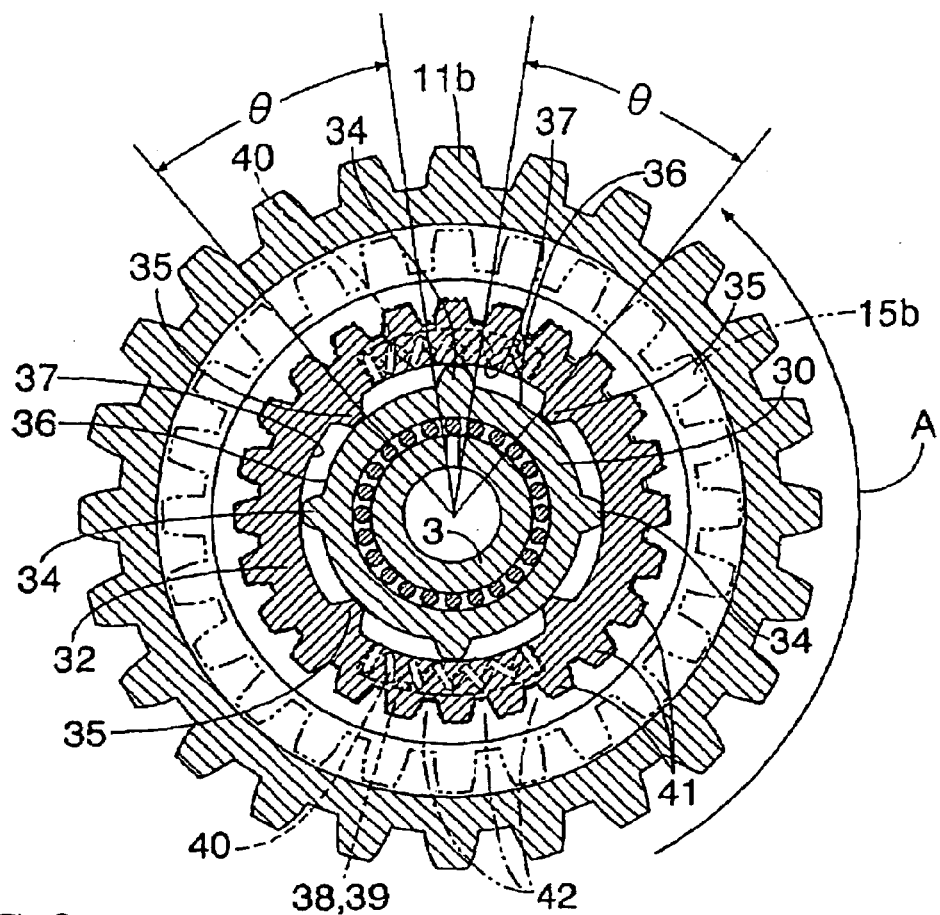
FIG. 2 is a cross-sectional view taken along line 2-2, presenting a dog clutch for a first speed according to the first embodiment as shown in FIG. 1.

In FIGS. 1 and 2, an annular recess 31 is formed around a hub 30 of the first speed driven gear 11b, on a side of the first speed driven gear 11b which is opposed to the fifth driven gear 15b. In the recess 31, a first dog clutch member 32 is splined to an outer circumferential surface of the hub 30. At respective spline portions of the hub 30 and the first dog clutch member 32, the widths of the splines 36, 37 are much larger than the widths of spline teeth 35, 34, and determined to be several times the widths of the spline teeth 35, 34, in the specific example shown in the figures. Thus, relative rotation clearances θ, θ are formed between the first dog clutch member 32 and the hub 30. On the hub 30 is attached a retaining ring 33 to inhibit the first dog clutch member 32 from separating from the hub 30.

Figure 3:
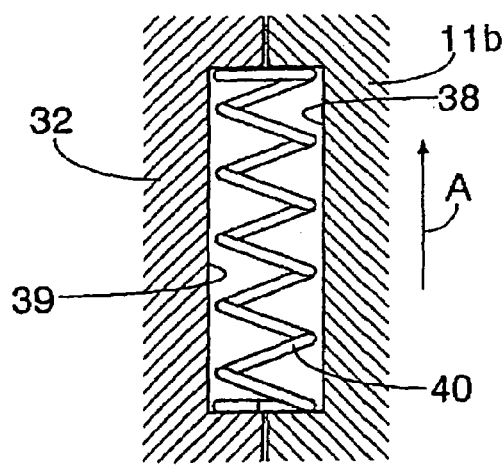
FIG. 3 is a cross-sectional view taken along line 3-3 in FIG. 1.
Figure 4:
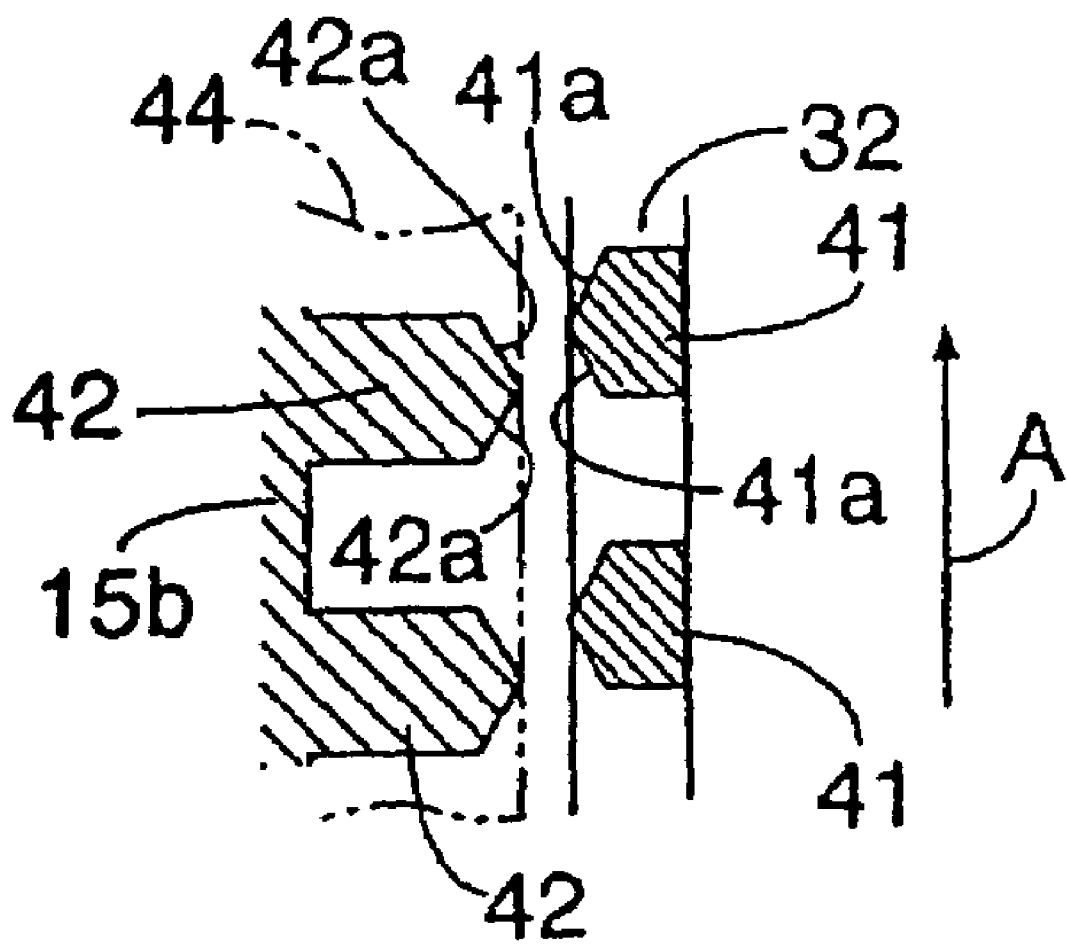
FIG. 4 is a cross-sectional view taken along line 4-4 in FIG. 1.

As shown in FIGS. 1, 2 and 4, a plurality of pairs of spring holding recesses 38, 39 whose respective open surfaces are opposed to each other are formed in opposed surfaces of the first speed driven gear 11b and the first dog clutch member 32. The spring holding recesses 38, 39 of each pair are circular or arcuate concentric with the first speed driven gear 11b and the first dog clutch member 32, and accommodate a damper spring 40 consisting of a single coil spring. Each damper spring 40 is preloaded in a compression direction to press an internal end surface of the spring holding recesses 38, 39. In an unloaded state of the first dog clutch member 32, where the spring holding recesses 38, 39 opposed to each other are phase-matched as shown in FIG. 3, the spline teeth 34, 35 of the first speed driven gear 11b and the first dog clutch member 32 are located at the centers of the respectively corresponding splines 37, 36, as shown in FIG. 2.

Like gear teeth, first dog teeth 41 are formed on an outer circumferential surface of the first dog clutch member 32. On the other hand, a cylindrical wall 44 to get into the recess 31 of the first speed driven gear 11b is integrally formed on the fifth speed driven gear 15b adjacent to the first speed driven gear 11b. Like gear teeth, second dog teeth 42 are formed on an inner circumferential surface of the cylindrical wall 44, such that the second dog teeth 42 are capable of engaging with the first dog teeth 41 substantially without backlash over an entire circumference. A pair of chamfers 41a, 42a which are contiguous in a rotational direction to form an angle therebetween are formed at an end portion of each of the first dog teeth 41 and an end portion of each of the second dog teeth 42, which are opposed to each other.

The fifth speed driven gear 15b having the second dog teeth 42 serves as a second dog clutch member of the first speed dog clutch 21, and will be hereinafter referred to as "a second dog clutch member 15b."

There will be now described an operation of the first embodiment of the invention.

When the transmission T is placed in neutral, the engine power is transmitted, via the staring clutch, to the input shaft 2 in the form of rotation thereof, and the first speed drive gear 11a integral with the input shaft 2 at the first gear train 11 is rotated together with the rotation of the input shaft 2. Further, the rotation of the first speed drive gear 11a is transmitted further to the first speed driven gear 11b in the from of rotation of the first speed driven gear 11b in a direction of arrow A, but the first speed driven gear 11b merely rotates freely on the output shaft 3. As described above, in this unloaded state of the first speed driven gear 11b, the spline teeth 34, 35 of the first speed driven gear 11b and the first dog clutch member 32 are located at the centers of the respectively corresponding splines 37, 36, by the preload of the damper springs 40, see FIG. 2.

Figure 5A:
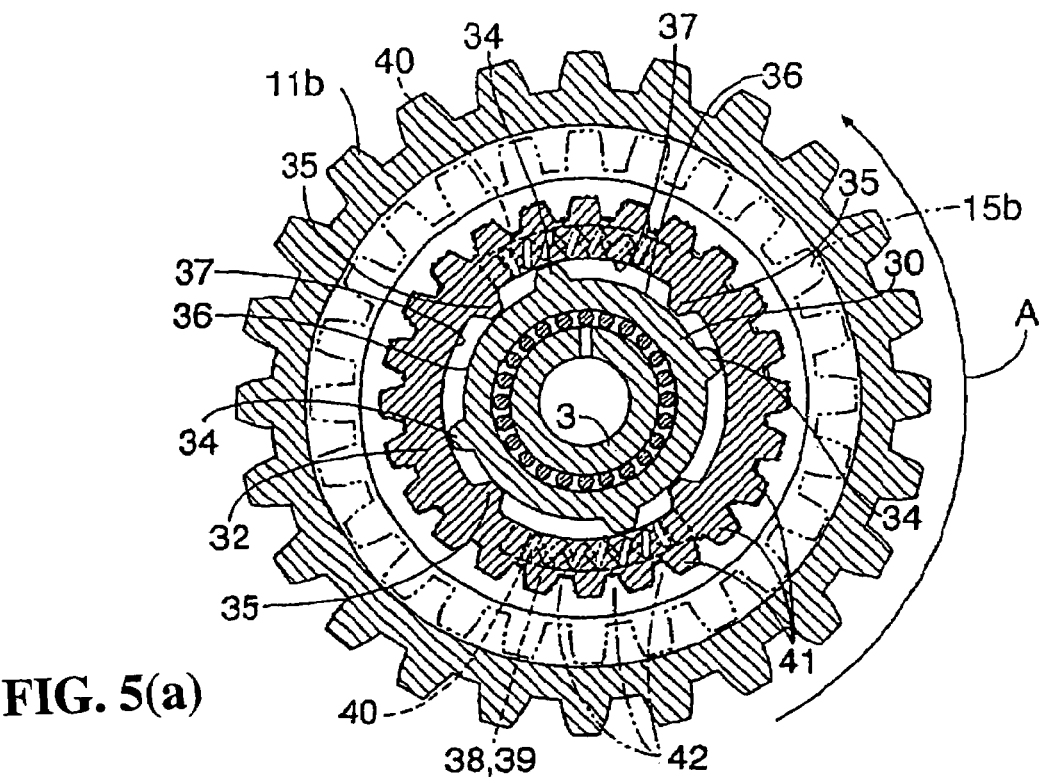
FIGS. 5(a), 5(b) and 5(c) illustrate a transient state established when the dog clutch of the first embodiment is engaged.
Figure 5B:
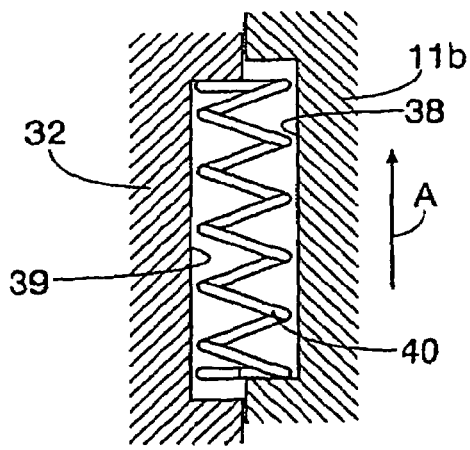
Figure 5C:
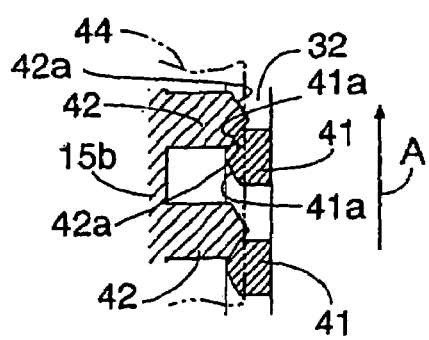
Figure 6A:
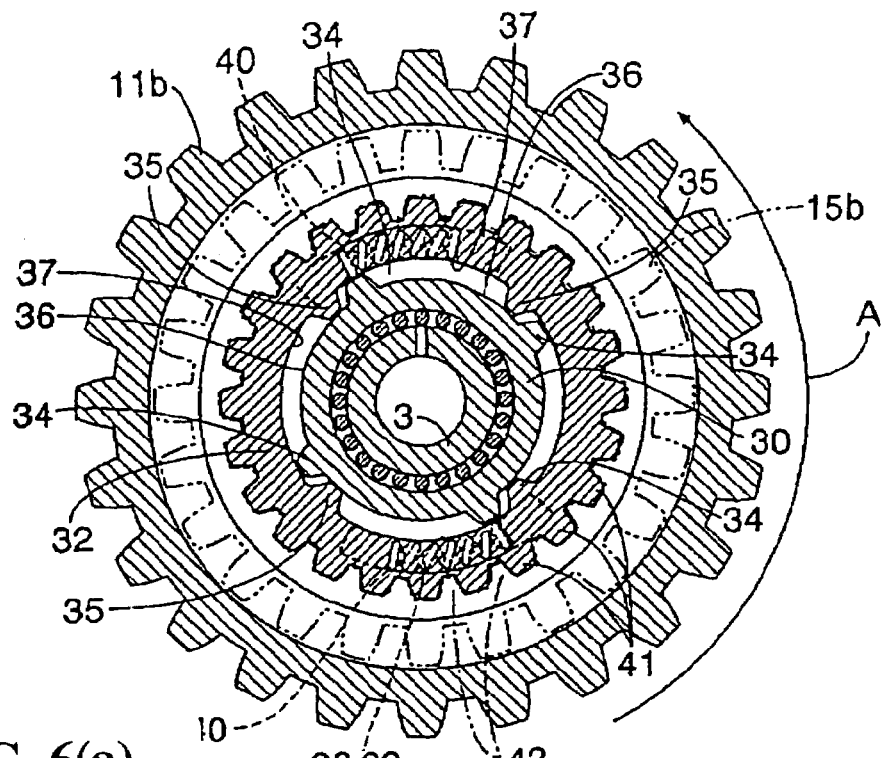
FIGS. 6(a), 6(b) and 6(c) illustrate a state where the dog clutch is fully engaged.
Figure 6B:
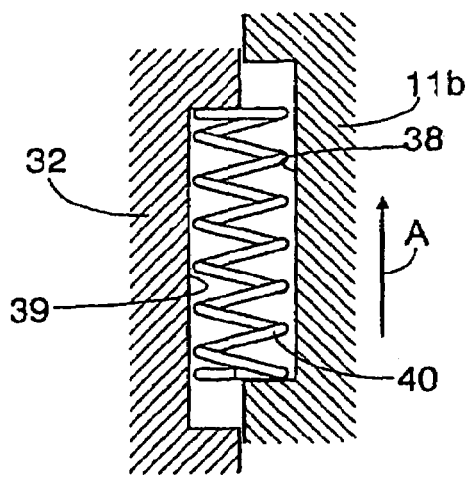
Figure 6C:
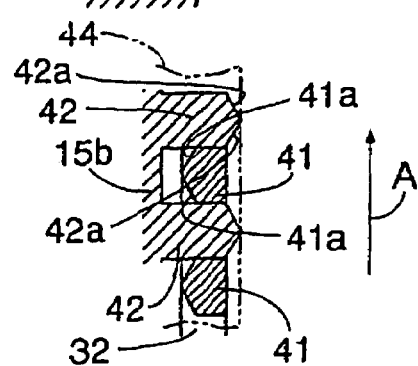
Figure 7:
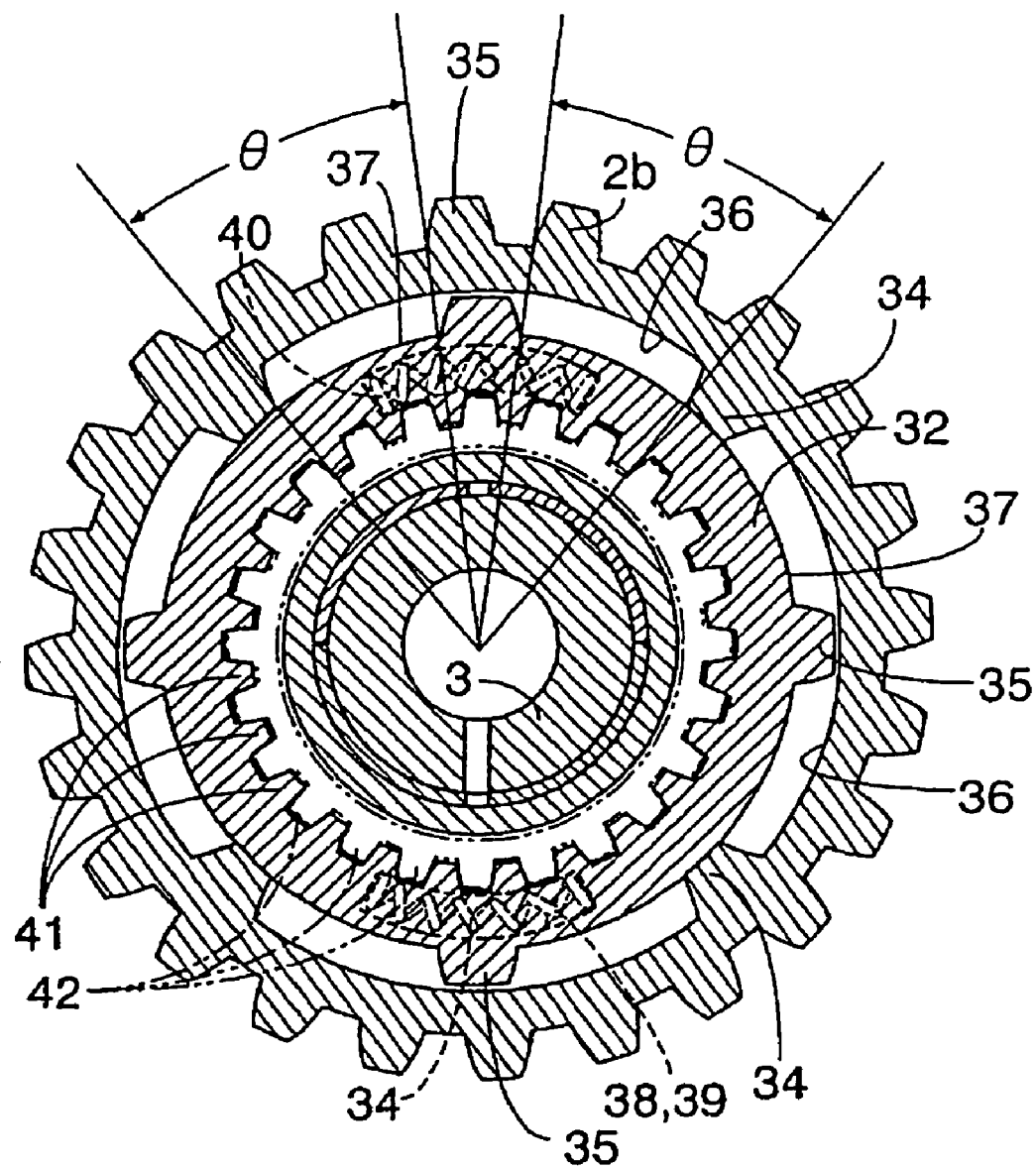
FIG. 7 is a cross-sectional view taken along line 7-7, presenting a dog clutch for a second speed according to the second embodiment as shown in FIG. 1.

To engage the first speed gear train 11, the starting clutch not shown is disengaged to disconnect the input shaft 2, and in this state the second dog clutch member 15b is shifted to the first dog clutch member 32. Initially, the chamfers 42a of the second dog teeth 42 of the second dog clutch member 15b are necessarily brought into contact with the chamfers 41a of the first dog teeth 41 of the first dog clutch member 32, as shown in FIG. 5(c). Then, the chamfers 41a, 42a as brought into contact are slid on each other, so that the second dog teeth 42 are shifted to a position to fully engage with the first dog teeth 41, as shown in FIG. 6(c), thereby engaging the first speed dog clutch 21. In this way, the first speed dog clutch 21 is reliably engaged by a single shifting operation of the second dog clutch member 15b, owing to the guide between the chamfers 41a, 42a of the first and second dog teeth 41, 42.

Even while the starting clutch is disconnected, the input shaft 2 keeps revolving with a very low torque due to the creep phenomenon and an inertia force slightly remaining at the starting clutch. Hence, the input shaft 2 keeps rotating the first speed driven gear 11b and the first dog clutch member 32 via the first drive gear 11a. Accordingly, when the chamfers 42a of the second dog teeth 42 of the second dog clutch member 15b which is inhibited from revolving by the output shaft 3 are brought into contact with the chamfers 41a of the first dog teeth 41 of the rotating first dog clutch member 32, the rotation of the first dog clutch member 32 is inhibited. By this, the relative rotation between the first speed driven gear 11b and the first dog clutch member 32 is caused to produce a difference in phase between the spring holding recesses 38, 39, as shown in FIG. 5(b), thereby compressing the damper springs 40. When a reactive torque generated by a reactive force of the compressed damper springs 40, and the slight torque of the first speed driven gear 11b balance, the rotation of the input shaft 2 and the first speed gear train 11 stops.

Accordingly, throughout a period from the moment when the chamfers 41a, 42a of the first and second dog teeth 41, 42 are brought into contact with each other to the moment when the dog teeth 41, 42 fully engage, the compression of the damper springs 40 progresses, during which the torque shock imposed on the transmission system is effectively absorbed.

Then, when the starting clutch is placed in an engaged state from the disengaged state in order to start the motorcycle, the relative rotation between the first speed driven gear 11b and the first dog clutch member 32 is furthered by a load received from the output shaft 3, thereby increasing the compressive deformation of the damper springs 40. Then, the spline teeth 34, 35 of the first speed driven gear 11b and the first dog clutch member 32 are brought into contact with each other, that is, one of the two clearances θ on opposite sides of each spline tooth becomes zero. Thus, the impact of the contact is relatively small. As a result of the inhibition of the relative rotation between the first speed driven gear 11b and the first dog clutch member 32, the driving torque of the engine transmitted to the input shaft 2 is transmitted, sequentially via the first speed drive gear 11a, the first speed driven gear 11b, the spline teeth 34 of the first speed driven gear 11b, the spline teeth 35 of the first dog clutch member 32, the first dog teeth 41, the second dog teeth 42, and the first dog clutch member 32, to the output shaft 3.

During operation of the motorcycle at a low speed, when the second dog clutch member 15b is shifted toward the first dog clutch member 32 to engage the first speed gear train 11, the same operation as described above is obtained except that the first dog clutch member 32 becomes a driver for the first speed driven gear 11b, and the first dog clutch 21 can be reliably engaged with the torque shock absorbed and lowered by the compressive deformation of the damper springs 40.

Referring back to FIG. 1, the second speed dog clutch 22 according to the second embodiment of the invention is constructed similarly to the first speed dog clutch 21, except that spline teeth 34, 35 are respectively formed on an inner circumferential surface of a rim 45 defining inside a recess 31 of the second speed driven gear 12b, and an outer circumferential surface of a first dog clutch member 32 fitted in the inner circumferential surface of the rim 45, and that gear teeth-like first dog teeth 41 and second dog teeth 42 are respectively formed on an inner circumferential surface of the first dog clutch member 32, and an outer circumferential surface of a cylindrical wall 44 of the sixth speed driven gear 16b which serves as a second dog clutch member. Parts of the second speed dog clutch 22 which correspond to those of the first speed dog clutch 21 are referred to by the same reference numerals and repetitive description thereof is omitted.

The second speed dog clutch 22 can give the same operation and effects as those of the first speed dog clutch 21.

Although the first and second embodiments of the invention have been described, the invention is not limited to these embodiments, but various design modifications may be made without departing from the gist of the invention. For instance, the invention is applicable to each of the third to sixth speed dog clutches 23-26. However, the invention is particularly effective when applied to the dog clutches for lower speed, where a shift shock tends to occur.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dog clutch comprising:
   a first dog clutch member coupled with a rotation transmitting member rotatably mounted on a power transmission shaft, with a relative rotation clearance (θ);
   a second dog clutch member slidably mounted on the power transmission shaft to be engageable/disengageable with/from the first dog clutch member;
   a first pair of spring holding recesses whose respective open surfaces are opposed to each other are formed in opposed surfaces of the first dog clutch member and the rotation transmitting member; and
   a first damper spring disposed in the first pair of spring holding recesses so as to be interposed between the rotation transmitting member and the first dog clutch member for being elastically deformable within a range of the relative rotation clearance (θ) by a torque generated between the rotation transmitting member and the first dog clutch member;
   wherein gear teeth-like first dog teeth and second dog teeth, which are engaged/disengaged with/from each other by an axial displacement of the second dog clutch member, are formed in the first dog clutch member and the second dog clutch member, respectively, and a chamfer is made in each end portion of the respective first dog teeth and each end portion of the respective second dog teeth, which are opposed to each other, so as to guide the second dog teeth to a position to engage with the first dog teeth.

2. The dog clutch according to claim 1, further comprising:
a second pair of spring holding recesses whose respective open surfaces are opposed to each other are formed in opposed surfaces of the first dog clutch member and the rotation transmitting member; and
a second damper spring disposed in the second pair of spring holding recesses so as to be interposed between the rotation transmitting member and the first dog clutch member,
said first pair of holding recesses being displaced angularly relative to said second pair of holding recesses.

3. The dog clutch according to claim 1, wherein the rotation transmitting member includes an annular recess and said first dog clutch member is splined to an inside of said annular recess and an outer circumferential surface of said first dog clutch member and said first dog teeth and said second dog teeth are formed, respectively, on an inner circumferential surface of the first dog clutch member and an outer circumferential surface of a cylindrical wall of the second dog clutch member.

4. The dog clutch according to claim 1, wherein the rotation transmitting member includes an annular recess and said first dog clutch member is splined to an outer circumferential surface of a hub member and said first dog clutch member is disposed within said annular recess.

5. The dog clutch according to claim 4, wherein a width of splines on the hub member is larger relative to the width of spline teeth for forming the relative rotation clearance ($\theta$) between the first dog clutch member and the hub member.

6. The dog clutch according to claim 4, and further including a retaining ring for preventing the first dog clutch member from separating from the hub.

7. The dog clutch according to claim 1, wherein said chamfer on each end portion of the teeth of said first dog teeth and said second dog teeth include a pair of chamfers being contiguous in a rotational direction to form an angle therebetween.

8. The dog clutch according to claim 7, wherein initially the chamfers of the second dog teeth are brought into contact with the chamfers of the first dog teeth and are slid relative to each other wherein the second dog teeth are shifted to a position to fully engage with the first dog teeth for thereby engaging the first dog clutch for reliably engaging in a single shifting operation of the second dog clutch member due to the guiding action between the chamfers of the first and second dog teeth.

9. The dog clutch according to claim 8, wherein during the time when the first and second dog teeth are brought into contact with each other to the moment when the first and second dog teeth are fully engaged, a compression of the damper first spring progresses during which the torque shock is effectively absorbed.

10. A dog clutch comprising:
a first dog clutch member for coupling with a rotation transmitting member rotatably mounted on a power transmission shaft, with a relative rotation clearance ($\theta$);
a second dog clutch member being slidably mounted on the power transmission shaft to be engageable/disengageable with/from the first dog clutch member;
a first pair of spring holding recesses whose respective open surfaces are opposed to each other are formed in opposed surfaces of the first dog clutch member and the rotation transmitting member;
a first damper spring disposed in the first pair of spring holding recesses so as to be interposed between the rotation transmitting member and the first dog clutch member to be elastically deformable within a range of the relative rotation clearance ($\theta$) by a torque generated between the rotation transmitting member and the first dog clutch member;
first dog teeth formed on the first dog clutch member;
second dog teeth formed on the second dog clutch member;
said first and second dog teeth being engaged/disengaged with/from each other by an axial displacement therebetween; and
a chamfer formed on each end portion of the respective first dog teeth and a chamfer formed on each end portion of the respective second dog teeth, which are opposed to each other, said chamfer providing a guide for the second dog teeth to be positioned to engage with the first dog teeth.

11. The dog clutch according to claim 10, further comprising:
a second pair of spring holding recesses whose respective open surfaces are opposed to each other are formed in opposed surfaces of the first dog clutch member and the rotation transmitting member; and
a second damper spring disposed in the second pair of spring holding recesses so as to be interposed between the rotation transmitting member and the first dog clutch member,
said first pair of holding recesses being displaced angularly relative to said second pair of holding recesses.

12. The dog clutch according to claim 10, wherein the rotation transmitting member includes an annular recess and said first dog clutch member is splined to an inside of said annular recess and an outer circumferential surface of said first dog clutch member and said first dog teeth and said second dog teeth are formed, respectively, on an inner circumferential surface of the first dog clutch member and an outer circumferential surface of a cylindrical wall of the second dog clutch member.

13. The dog clutch according to claim 10, wherein the rotation transmitting member includes an annular recess and said first dog clutch member is splined to an outer circumferential surface of a hub member and said first dog clutch member is disposed within said annular recess.

14. The dog clutch according to claim 13, and further including a retaining ring for preventing the first dog clutch member from separating from the hub.

15. The dog clutch according to claim 13, wherein a width of splines on the hub member is larger relative to the width of spline teeth for forming the relative rotation clearance ($\theta$) between the first dog clutch member and the hub member.

16. The dog clutch according to claim 10, wherein said chamfer on each end portion of the teeth of said first dog teeth and said second dog teeth include a pair of chamfers being contiguous in a rotational direction to form an angle therebetween.

17. The dog clutch according to claim 16, wherein initially the chamfers of the second dog teeth are brought into contact with the chamfers of the first dog teeth and are slid relative to each other wherein the second dog teeth are shifted to a position to fully engage with the first dog teeth for thereby engaging the first dog clutch for reliably engaging in a single shifting operation of the second dog clutch member due to the guiding action between the chamfers of the first and second dog teeth.

18. The dog clutch according to claim 17, wherein during the time when the first and second dog teeth are brought into contact with each other to the moment when the first and second dog teeth are fully engaged, a compression of the first damper spring progresses during which the torque shock is effectively absorbed.

19. A dog clutch comprising:
   a first dog clutch member for coupling with a rotation transmitting member rotatably mounted on a power transmission shaft, with a relative rotation clearance ($\theta$);
   a second dog clutch member being slidably mounted on the power transmission shaft to be engageable/disengageable with/from the first dog clutch member;
   a damper spring interposed between the rotation transmitting member and the first dog clutch member to be elastically deformable within a range of the relative rotation clearance ($\theta$) by a torque generated between the rotation transmitting member and the first dog clutch member;
   first dog teeth formed on the first dog clutch member;
   second dog teeth formed on the second dog clutch member;
   said first and second dog teeth being engaged/disengaged with/from each other by an axial displacement therebetween; and
   a chamfer formed on each end portion of the respective first dog teeth and a chamfer formed on each end portion of the respective second dog teeth, which are opposed to each other, said chamfer providing a guide for the second dog teeth to be positioned to engage with the first dog teeth,
   wherein the rotation transmitting member includes an annular recess and said first dog clutch member is splined to an inside of said annular recess and an outer circumferential surface of said first dog clutch member and said first dog teeth and said second dog teeth are formed, respectively, on an inner circumferential surface of the first dog clutch member and an outer circumferential surface of a cylindrical wall of the second dog clutch member.

20. The dog clutch according to claim 19, wherein said first dog clutch member is disposed within said annular recess.

* * * * *